US012505722B2

(12) United States Patent
Wood et al.

(10) Patent No.: US 12,505,722 B2
(45) Date of Patent: Dec. 23, 2025

(54) SUPERTRACKS

(71) Applicant: RAW IGAMING LTD., Pieta (MT)

(72) Inventors: Thomas Robert Wood, Kalmar (SE); Alec Horley, Barnum (GB); Nicolas Pavelek, Buenos Aires (AR)

(73) Assignee: RAW IGAMING LTD., Pieta (MT)

( * ) Notice: Subject to any disclaimer, the term of this patent is extended or adjusted under 35 U.S.C. 154(b) by 245 days.

(21) Appl. No.: 18/517,817

(22) Filed: Nov. 22, 2023

(65) Prior Publication Data

US 2024/0242576 A1 Jul. 18, 2024

Related U.S. Application Data

(60) Provisional application No. 63/427,744, filed on Nov. 23, 2022.

(51) Int. Cl.
*G07F 17/00* (2006.01)
*G07F 17/32* (2006.01)

(52) U.S. Cl.
CPC ...... *G07F 17/3295* (2013.01); *G07F 17/3258* (2013.01)

(58) Field of Classification Search
CPC . G07F 17/3295; G07F 17/358; G07F 17/3258
See application file for complete search history.

(56) References Cited

U.S. PATENT DOCUMENTS 6,378,042 B1 * 4/2002 Henderson .......... G06F 12/0802 711/134
10,726,678 B1 * 7/2020 Rehill ................... G07F 17/326
2001/0038178 A1 * 11/2001 Vancura .............. G07F 17/3244 273/274
2003/0050111 A1 * 3/2003 Saffari ................ G07F 17/3255 463/25
2004/0172508 A1 * 9/2004 Nguyen .............. G06F 11/1666 711/162
2005/0070353 A1 3/2005 Webb et al.
2005/0277457 A1 * 12/2005 Wilson ................ G07F 17/3267 463/12
2006/0003832 A1 * 1/2006 Mincey .............. G07F 17/3267 463/20

(Continued)

OTHER PUBLICATIONS

WO, PCT/IB23/00759 ISR and Written Opinion, Apr. 19, 2024.

*Primary Examiner* — Jeffrey K Wong
(74) *Attorney, Agent, or Firm* — ONE LLP

(57) ABSTRACT

Disclosed are example embodiments of a systems and methods related to gaming and gaming systems. In an example, a gaming system includes at least one processor and a memory coupled to the at least one processor. The at least one processor is configured to generate a piece that is displayed in the game and generate a grid layout for display in the game, including a track. The at least one processor is configured to generate a marker to be placed within the grid and display the piece at a start point for the track when a piece has an open path in front of the piece, then the piece moves forward, and the game commences. When a piece reaches an end of the visible board, the view on the grid shifts, and additional markers are added to allow movement to continue up to a maximum size. The at least one processor is configured to pay a jackpot upon reaching an end of the grid.

7 Claims, 2 Drawing Sheets

(56) References Cited

U.S. PATENT DOCUMENTS

| | | | | |
|---|---|---|---|---|
| 2007/0057464 | A1* | 3/2007 | Cockrell, Jr. | A63F 1/00 273/303 |
| 2007/0099695 | A1* | 5/2007 | Wilson | G07F 17/34 463/25 |
| 2007/0117603 | A1* | 5/2007 | Seelig | G07F 17/3211 463/16 |
| 2007/0265053 | A1 | 11/2007 | Linard et al. | |
| 2008/0039190 | A1* | 2/2008 | Walker | G07F 17/32 463/25 |
| 2008/0242421 | A1* | 10/2008 | Geisner | A63F 13/75 463/42 |
| 2010/0113122 | A1 | 5/2010 | Walker et al. | |
| 2011/0105233 | A1 | 5/2011 | Aoki | |
| 2012/0004033 | A1* | 1/2012 | Lyons | G07F 17/3211 715/702 |
| 2012/0238343 | A1 | 9/2012 | Perrone et al. | |
| 2014/0114890 | A1* | 4/2014 | Fujimaki | G06N 20/00 706/12 |
| 2014/0335933 | A1 | 11/2014 | Robbins et al. | |
| 2015/0141118 | A1 | 5/2015 | Lefebvre et al. | |
| 2016/0063799 | A1* | 3/2016 | Reeves | G07F 17/326 463/17 |
| 2016/0217657 | A1 | 7/2016 | Halter et al. | |
| 2018/0130285 | A1* | 5/2018 | Ang | G07F 17/3244 |

* cited by examiner

SUPERTRACKS

CROSS-REFERENCE TO RELATED APPLICATIONS

The present application for claims priority to U.S. Provisional Application No. 63/427,744, filed Nov. 23, 2022, is hereby incorporated by reference in its entirety.

TECHNICAL FIELD

The disclosure relates generally to the field of gaming, and specifically and not by way of limitation, some embodiments are related to gaming formats.

BACKGROUND

Current games may have the following 3 problems: (1) innovating that is not outside of the current slot game experience, (2) complicated player experience, and/or (3) millennials and other new player bases may be difficult to attract due to unfamiliar game styles and stigmatisms with Casino gaming.

The Sea of Sameness

In online casino gaming today, between 200-250 new online Casino games are released each month. That's around 7-9 games per day going live which neither operator nor players can consume. 85-90% of these look the same and have the same features. This underlines the commoditization of Casino games and online gaming lobbies have started to look like grocery store shelves where positioning and rebates/offers drive public consumption. With increasing regulation, rebates and offers are becoming a thing of the past, so it is our belief that in the near future innovation and differentiation will drive operator and public consumption. This even extends to land-based gaming where a casino floor looks like a sea of buffalos, leprechauns and Egyptian games with similar game play, sounds and mechanics.

Simplifying the Player Experience

The other 10-15% of studios who do try to innovate still take a standard approach to games but attempt to create more differentiation through adding more symbols, bigger-sized games, more winning lines & combinations which creates more and more complex games that players can find hard to follow and understand, especially if you are new to iGaming. When experiencing them on smaller mobile interfaces it becomes harder to see or follow the gaming experience and players can become confused as to why they won or lost. Some games offer up to 1-2 million winning lines which is impossible to visually represent and difficult for the player to follow. Some games can grow from 3×5 (columns & rows) to 10×16 creating a huge array of symbols, win lines and animations. While the presentation is exciting, this complicates the view for players and makes it hard to understand and follow what is causing the win or miss.

SuperTracks® creates an exciting new experience for players through simplified gameplay so players can easily follow the game and understand game payouts and win opportunities.

SUMMARY

Disclosed are example embodiments of a systems and methods related to gaming and gaming systems. In an example, a gaming system includes at least one processor and a memory coupled to the at least one processor. The at least one processor is configured to generate a piece that is displayed in the game. The at least one processor is configured to generate a grid layout for display in the game, including a track. The at least one processor is configured to generate a marker to be placed within the grid. The at least one processor is configured to display the piece at a start point for the track when a piece has an open path in front of the piece, then the piece moves forward, and the game commences. When a piece reaches an end of the visible board, the view on the grid shifts, and additional markers are added to allow movement to continue up to a maximum size. The at least one processor may be configured to pay a jackpot upon reaching an end of the grid.

An example method includes the steps of generating a piece that is displayed in the game, generating a grid layout for display in the game, including a track, generating a marker to be placed within the grid, and displaying the piece at a start point for the track. When a piece has an open path in front of the piece, moving the piece forward, and the game commences. When a piece reaches an end of the visible board, the view on the grid shifts, and additional markers are added to allow movement to continue up to a maximum size, and paying a jackpot upon reaching an end of the grid.

A non-transitory computer-readable medium storing instructions that, when executed by one or more processors of a gaming system, cause the gaming system to generate a piece that is displayed in the game, generate a grid layout for display in the game, including a track, generate a marker to be placed within the grid, and display the piece at a start point for the track. When a piece has an open path in front of the piece, then the piece moves forward, and the game commences. When a piece reaches an end of the visible board, the view on the grid shifts, and additional markers are added to allow movement to continue up to a maximum size.

The features and advantages described in the specification are not all-inclusive. In particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principals involved and to enable a person skilled in the relevant art(s) to make and use the disclosed technologies.

Figure 1:
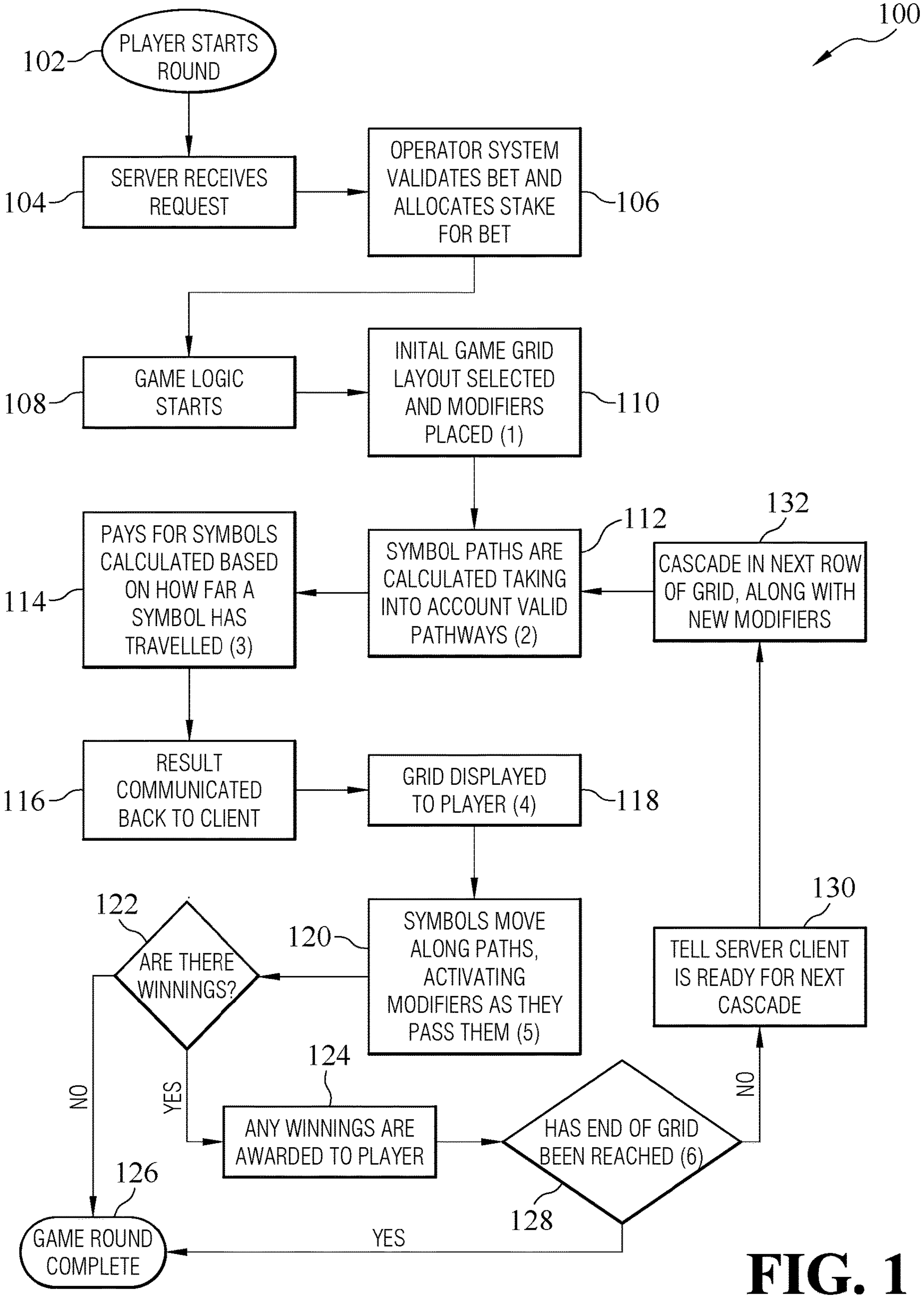
FIG. 1 is a flow diagram illustrating an example method in accordance with the systems and methods described herein.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

The detailed description set forth below in connection with the appended drawings is intended as a description of configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A gaming system may be provided, including at least one processor and a memory coupled to the at least one processor. The at least one processor may be configured to perform various functions within the game, as outlined in the following paragraphs. In one embodiment, the gaming system may generate a game piece that is displayed in the game. This game piece represents a player's avatar or character within the game environment. Furthermore, the gaming system may generate a grid layout for display in the game. This grid layout includes a track, which serves as the path for the game piece to follow. The gaming system may generate a marker to be placed within the grid. These markers play a significant role in guiding the game piece along its designated path. The game piece may be displayed at a start point for the track. In various embodiments, this start point may be positioned at the bottom or the left side of the grid layout, offering different strategic possibilities for players. When a game piece has an open path in front of it, the game piece may move forward, initiating the commencement of the game round. In certain embodiments, when a game piece reaches the end of the visible board, the view on the grid may shift, and additional markers may be added. This dynamic feature allows movement to continue within the game grid, ensuring an engaging and prolonged gameplay experience up to a maximum size. In some embodiments, the gaming system may offer the possibility of winning a jackpot upon reaching an end of the grid, further enhancing the excitement and rewards for players.

In another aspect, a method for operating the gaming system is disclosed. This method may encompass the various functionalities described with respect to the gaming system described herein. In one embodiment, the method involves generating a game piece for display, creating a grid layout with a track, and generating markers for placement within the grid. The game piece is displayed at a start point on the grid, which may be located at the bottom or left side, as previously described in embodiments. When a game piece has an open path in front of it, the game piece moves forward, marking the commencement of the game round. If the game piece reaches the end of the visible grid, the view on the grid shifts, and additional markers are introduced, enabling continued movement up to a maximum size. Similar to the system embodiment, this method may also include the option to pay a jackpot upon reaching the end of the grid, providing additional incentives for players.

Additionally, a non-transitory computer-readable medium may be provided, storing instructions that, when executed by one or more processors of a gaming system, cause the gaming system to perform the functions outlined in the system and method embodiments.

Differentiation and innovation are seldom seen as studios either do not have the creativity to come with something new, aren't willing to take the risk to innovate, do not see the value in innovation or don't have the financial backing to allow for it. RAW iGaming aims to solve this issue by presenting operators and players with unique new math mechanics and game presentations that offer new and exciting experiences which cut through the "Sea of Sameness," e.g., the current games that are all similar to each other. This gives operators something new to market and differentiate themselves against others. Each math engine or game product RAW creates, brings a new way of playing Casino games as well as a new way in which Casino games introduce a game round.

In one example embodiment, the SuperTracks® game engine may present a new family of game play, where the way a winning round is represented may be based on positioning of a symbol versus whether symbols appear in a line, in clumps or across ways. Typically slot games pay a win based on one of six forms of payment including: the use of lines, where any number of same symbols end up on a pre-determined pay line starting from the left and award a payment depending upon the symbol value and the number of symbols in that line, the use of anyways pays, which ignores lines and awards a pay as long as the same symbol appear from the left in any position on a reel set column, the use of both ways lines or anyways, where any number of same symbols end up on a pre-determined pay line or anyways no line pay starting from either left or right and award a payment depending upon the symbol value and the number of symbols in that line, the use of cluster pays, where a cluster of the same symbols of at least five are connecting to each other in any given location or shape on the reel set after the completion of a spin, the use of connecting pays, where any same symbols are in a line of at least three same symbols in any given location on the reel set after the completion of a spin, the use of scatter pays, where at least two predetermined special scatter symbols appear in any position on the reels during the completion of a spin In an example embodiment, SuperTracks® instead may pay based on the position of a symbol as it enters the reel set when a "track" or "path" align on the completion of a spin. The further a symbol travels in the reel set on a track or the higher the symbol travels in the reelset awards a payment. Pays can be independent of direction and can be either based on movement or the collection of items along the symbols path.

This creates a more app-like, gamified, Casino experience than a traditional slot experience that traditional players are used to playing. SuperTracks® opens the Casino game to experiences more similar to board games with game pieces making winnings or payments based on the piece's movement around a board or in this case, within a reelset. Millennials may be more familiar with iOS or Android-styled app gaming than Casino gaming and SuperTracks® may create a more recognizable, familiar and simpler game form that delivers an entirely new, unseen, game presentation and experience that is very differentiated in the Sea of Sameness.

This is true online as in land-based where the games look similar and SuperTracks® would stand out as unique, offer a new presentation layer as well as a new mathematical experience essentially removing the need for advanced and sometimes confusing payment methods or symbol reel strips altogether. This also opens the door to entirely new mechanics and games that don't exist on the market and eventually could be coined as a new style of game play. We want to protect this idea of symbol tracking across the reelset over one spin, a series of spins or cascades for payment as well as the use of static game symbols with a start position as always appearing either outside or in a predetermined position within the game of the spinning or cascading reel set.

2. Simplifying the Player Experience

The SuperTracks® mechanic presents the game as an empty reel set, and all the paying symbols appear either in a fixed position or outside of the reel set at the start of a spin or cascade. This makes it very easy to follow the game as all the player needs to pay attention to is the symbol, its position on the reels and whether it is collecting wins across any given spin or cascade session versus several rows and columns of what can be confusing payments based on a series of symbol lines, cluster pays, scatter pays, connecting pays, anyways or both ways payments. Traditional symbol payments could be represented in a multitude of symbol combinations and when games present 10-15 rows or large million ways combinations it becomes hard to follow for the player on what and how they won. SuperTracks® presents all the possible winning combinations only based on the symbol's movement, its position and anything collected along its path keeping it very simple for the player to understand payments and follow the gameplay.

3. Target millennials and other new player bases that are difficult to attract Millennials have been difficult to attract on the Casino floor and to online Casino sites. This is because the old-style of traditional Casino gaming is lacking social and app-styled game play, such as Candy Crush, TikTok or E-sports. Currently millennials are more interested in table games, due to their more skill-based and social experience. Even Live Casino has fared better with millennials, but the Casino floor and online lobbies have failed in that transition.

An average daily session on a social product such as TikTok is over 2.5 hours, the average session on a e-sports game is around 1.5 hours and most millennials binge on Netflix for more than 9 hours per week. The average session time for an only Casino game is less than 12 minutes. Hardly comparable to the new entertainment that the millennials and generation x are playing/watching.

The SuperTracks® mechanic offers a completely new way of presenting games and could be considered a new category of online, live or land-based games. More akin to app-styled gaming, which is more familiar to the new generation of player, SuperTracks® opens Casino gaming to board-like games, social gaming-like adventures, and heavily themed experiences.

This style of game is more understandable for the newer generation and matches closer to what they are already viewing and playing. It is our belief that with this new mechanic we can start to bridge this gap and create a casino experience that increases player session times and attracts new players to operators and casinos.

The movement of the symbols outside of the reels and the representation of the pays based on position of the symbols could be represented in different manors and the symbols themselves do not actually have to appear outside of the reels. They could appear inside of the reels and still then create paid movements based on a positioning mechanism.

The symbols could be represented as pieces in a board game and dice could be thrown to represent the movement of the piece and its payout based on its position within the board game.

The reels could form first and then the pieces added after the completion of a spin to create anticipation or a different game experience.

The only alternative approach is to present the visual art result of the mathematical outcome in the game in a different manor as to appear different to the player. As the pays are represented by the position or movement of the symbol, this could be represented in a unlimited number of ways and hence it's only the presentation layer that could be unique and different and hence possibly be called something different to SuperTracks™ and marketed under a different name but the mechanics, the base set of rules for pays, the movement of the symbols versus the spin and combination of the symbols, would more or less be the same so it's very difficult to deliver alternatively.

The math and presentation could be used in any game format. This includes games for lottery, social games, board games that utilize a digital interface, digitally presented land based Casino, Online or land-based Live presented games, land-based Casino hardware representation, bonusing and gamification features, jackpot awards, basically anything utilizing a digital interface which wishes to present a track combination that allows a symbol or game piece to move and award results based on a dynamic randomly generated result.

Most Casino games tailor to an older, more traditional Casino player base. It has been difficult for online and land-based suppliers to find game styles that meet the interest for new player groups such as Millennials. This player base is more interested in other forms of entertainment such as Netflix, YouTube, TikTok or the new e-sport styled gaming such as Fortnight or Counter Strike and if our industry doesn't find a way to tailor games that interest this base, we might find ourselves with a much smaller customer base in the next 10 to 15 years.

Studios are calling minor adjustments in math features or game art enhancements as innovations, however the experience for the player is still the same as before. Very few have created new innovations that break outside of the normal templates of traditional slot mechanics and are still focused on traditional slot players. Studios are open about copying their competitors game styles and mechanics which comes down to "if it works for them it should work for us . . . " but leaves operators with less differentiation in their offering and players with very similar gaming experiences and no focus on new and evolving player bases.

In an example embodiment, Supertracks may be a game system that takes the idea of slot machines and applies a new and original idea on how the slot machine pays. For example, instead of paying on traditional paylines, or matching symbols, Supertracks may use the concept of pieces and markers on a grid to come up with paying combinations. For example, a piece may be an item that is displayed within the game, and may be denoted by some kind of object, e.g., a train. Each piece may have a value related to the piece. The value may indicate how much the piece pays. Markers may be items that are placed within a grid layout that the piece may interact with. The markers may be one or more of the following: (1) a pathway that the piece can follow, (2) a modifier that affects the value of win, (3) a trigger for an in-game feature, and (4) a blocker that ends the round. A grid may be where markers are laid in order to potentially create tracks for the pieces. The grid may be larger in one direction than in another. For example, the grid may be larger in one direction than in another in order to give an indication of the direction of travel. In an example, along the edge of the grid, multipliers might be displayed to indicate the value multiplier for the piece, should it manage to travel this far. In an example, the first three steps of the grid may not award a payout and may be the minimum required distance for a piece to travel, before pays can start.

Gameplay

In an example, in order to play, several pieces may be placed at the start point for the track. The number of pieces may vary between games, but should always be more than 1, in an example. Depending on orientation, the start point may be either at the bottom or at the left. Once the round starts, markers may be dropped into a grid from above. The set of markers may be determined either through the use of reels, or else through the use of biases. When a piece has an open path in front of the piece, then the piece moves forward, and the game commences. As the piece moves along the grid, the value of the piece may increase until the piece can travel no further. Once a piece reaches the end of the visible board, the view on the grid may shift, and additional markers may be added to allow movement to continue up to a maximum size. Reaching the end of the grid may pay a jackpot of some kind.

Modifiers and Triggers

As mentioned, the markers may be modifiers, or feature triggers, that may be enacted upon, should the piece arrive at that position. Some examples of modifiers and features are as follows: (1) multiplier marker: this will multiply the current value of the piece, to increase wins, (2) track changer: this could move the piece to a new track that might make it easier to get further, or could potentially penalize the ability to move further, (3) tunnel: since a piece can move across the grid, as well as along the grid, there might be tunnels at the edges that can bring the piece back onto the other side of the grid at a different point, to allow movement to continue, and potentially even boost payout, (4) free games: upon reaching a free games marker, the player could get the opportunity to play multiple extra games of Supertracks, awarding extra prizes, (5) turntable: at a track intersection, it may be possible for the piece to switch between tracks, (6) dead end: this is what will end travel along a track. A dead end may have a bonus payout attached to the dead end but might also just award the current value of the train.

FIG. 1 is a flow diagram illustrating an example method 100 in accordance with the systems and methods described herein. In an example, some basic points of the game may be:

1. The game grid may be the "world" within which game symbols will move. The game grid may include tiles which are filled with either pathway, blockers, or modifiers. The game grid may be aligned vertically or horizontally.
2. The symbols may have specific multiplier values. As the symbols travel along the path, the symbols may get further along the grid. Modifiers the symbols encounter may affect the train, promoting the train's progress, moving the train to a different path, upgrading the train's value or even stopping the train from moving further. In some cases, a modifier may even transfer the player to a different game mode, such as free spins.
3. Pays for a symbol may be calculated based on a multiplier from the furthest position reached along the game grid multiplied by the value of the train.
4. The player will have the game grid revealed to them within the game client. This may display the pathways and modifiers and show the symbols at the start of the grid.
5. The movement planned in stage two may be played out as a sequence of events, with the symbol stopping temporarily for any modifier the symbol encounters on the symbol's travels.
6. Grid may be a finite size or may be infinite in size (or very large). If the player has not reached the end of the grid, and has had a winning (e.g., move further along the path) then the player may be offered the next row in the grid, via a cascade mechanism. This then calls back to the server, the next row may be generated, and the game continues.

The game may end when the player reaches the end of the grid or does not win.

Selections of results can come in multiple ways, some options include: (1) Reels Based, the rows of the grid are represented as reels. These will have pathways, modifiers and blockers on them. The reels are then spun to create the game grid upon which the symbols will move. A Reels based layouts may always usually a finite length. (2) Bias Based, the grid can be generated via random selection of the individual tiles based on weights assigned to each particular tile variety. This then can be used to create layouts that can be infinite in length (or very large). (3) Scenario Based. Another option is to use a scenario-based approach, where the actual result to be played is pre-stored in a large variety of options. A particular pays scenario is then selected and applied to the grid. Pre-created scenarios could be combined for different sections of the grid to create varied layouts with more control over the aesthetic of the grid.

A player may start a round (102), which may cause a server to receive a request (104). An operating system, e.g., at the server, may validate a bet and allocate a stake for the bet (106). The game logic may begin (108). The initial game grid layout may be selected, and modifiers may be placed (110) For example, the game grid may be the "world" within which game symbols will move. The game grid may include tiles which may be filled with either pathway, blockers, or modifiers. The game grid may be aligned vertically or horizontally. Symbol paths may be calculated taking into account valid pathways (112). For example, the symbols may have specific multiplier values. As the symbols travel along the path, the symbols may get further along the grid. Modifiers the symbols encounter may affect the train, promoting the train's progress, moving the train to a different path, upgrading the train's value or even stopping the train from moving further. In some cases, a modifier may even transfer the player to a different game mode, such as free spins. Symbols may be calculated based on how far a symbol has traveled (114). In an example, a game may pay for a symbol may be calculated based on a multiplier from the furthest position reached along the game grid multiplied by the value of the train. Results may be communicated back to a client (116) and the grid displayed to the player (118). For example, the player may have the game grid revealed to them within the game client. This will display the pathways and modifiers and show the symbols at the start of the grid.

Symbols move along paths, activating modifiers as they pass them (120). For example, the movement planned in stage 2 may be played out as a sequence of events, with the symbol stopping temporarily for any modifier it encounters on its travels. A winnings determination may be made (122). Accordingly, any winnings may be awarded to the player (124) and the game round may be complete (126). After any winnings are awarded to the player (124) a determination may be made if the end of the grid has been reached (128). For example, the grid may have a finite size or can be infinite in size (or very large). If the player has not reached the end of the grid, and has had a winning (e.g., move further along the path) then they will be offered the next row in the grid, via a cascade mechanism. This then calls back to the server, the next row is generated, and the game continues. If the end of the grid has been reached, the game round is complete (126). If the end of the grid has not been reached (128), the system may communicate to the server that client is ready for the next cascade (130). Accordingly, a cascade in the next row of the grid, along with any new modifiers may be generated (132) and symbol paths may be calculated taking into account valid pathways (112). For example, as discussed above, the symbols have specific multiplier values. As they travel along the path, they can get further along the grid. Modifiers they encounter can affect the train, promoting its progress, moving it to a different path, upgrading its value or even stopping it from moving further. In some cases, a modifier can even transfer the player to a different game mode, such as free spins.

Frontend Systems for Use in the System

The frontend system may refer to any entity used to interact with the system. This may be divided into two parts, hardware and software.

The Hardware

For the system being described, the hardware can take the form of any interface-enabled system. The device in use can range in complexity. Hardware examples include, but are not limited to a desktop personal computer (PC), a laptop computer, a betting terminal, a tablet device, a mobile device (such as a mobile telephone handset), and/or a virtual reality (VR) device or augmented reality (AR) device.

1. Desktop PC. A desktop system that may be used by one or more people, in environments such as an internet café, or a home, where the device would be generally considered "non portable". Examples would include an Apple Desktop device, or a Tower PC.
2. Laptop. A device that is similar to a desktop and would produce a similar experience but can be moved easily between locations. This device would have a variety of inputs, from a specific attached, or in-built keyboard, to a touch-screen input allowing the user to use the device more like a tablet. Examples might include a MacBook, an Alienware r18, or a Chromebook.
3. Betting terminal. This is a device available to users that is fixed in position, but does not fulfil the above qualifications, and is accessed only through touch-screen. Although the internal hardware may be similar to a desktop PC, the interaction for the user will be through restricted access systems, such as a restricted keyboard, or a touchscreen. The user will not have full control of this device and will be limited to applications allowed by the host of the device.
4. Tablet device. A tablet device can be considered any touchscreen device that does not fulfill the qualifications of a laptop or desktop, but still is not a full mobile device, as it does not have mobile network communications. Examples here might be a Wi-Fi-only Samsung tablet, or a Wi-Fi-only iPad. Specifically, this device will be reliant upon a Wi-Fi network to be able to access the system.
5. Mobile device. This is a full mobile network device. It will operate similar to a tablet device, insomuch as it typically uses touchscreen input, but is not always limited to this, with some devices having keyboard input as well. Identifiably, this sort of device will have independent access to a data network, as long as sufficient signal is available.
6. VR or AR. As technology allows, it may be possible for users to interact with the systems via either Virtual Reality, or Augmented Reality. In the first instance, via a direct viewer showing the system in question, or in the second instance, by showing the system superimposed over a view that may already be available to the user The Software The software in use for the frontend will cover any system that can be used to show the result of the system. Some examples include, but are not limited to a web client, a native application (app), and/or a native desktop application, for example.

1. Web client. This covers any client written for use in a web environment that can be accessed through a web browser. Delivery of the content to the user could include systems such as Canvas and WebGL as part of DHTML, built using an interpreted language, such as JavaScript or could include systems such as Unity that will result in the same effect.
2. Native App. This is an app built for a Table, Mobile, or AR/VR device in a language such .net, using technology like Xamarin that can be delivered into app store for use by players
3. Native Desktop Application. This would be any application built in a native language, including items such as Java or C++ that would run locally on a desktop or laptop system and allow users to interact using their local hardware.

Figure 2:
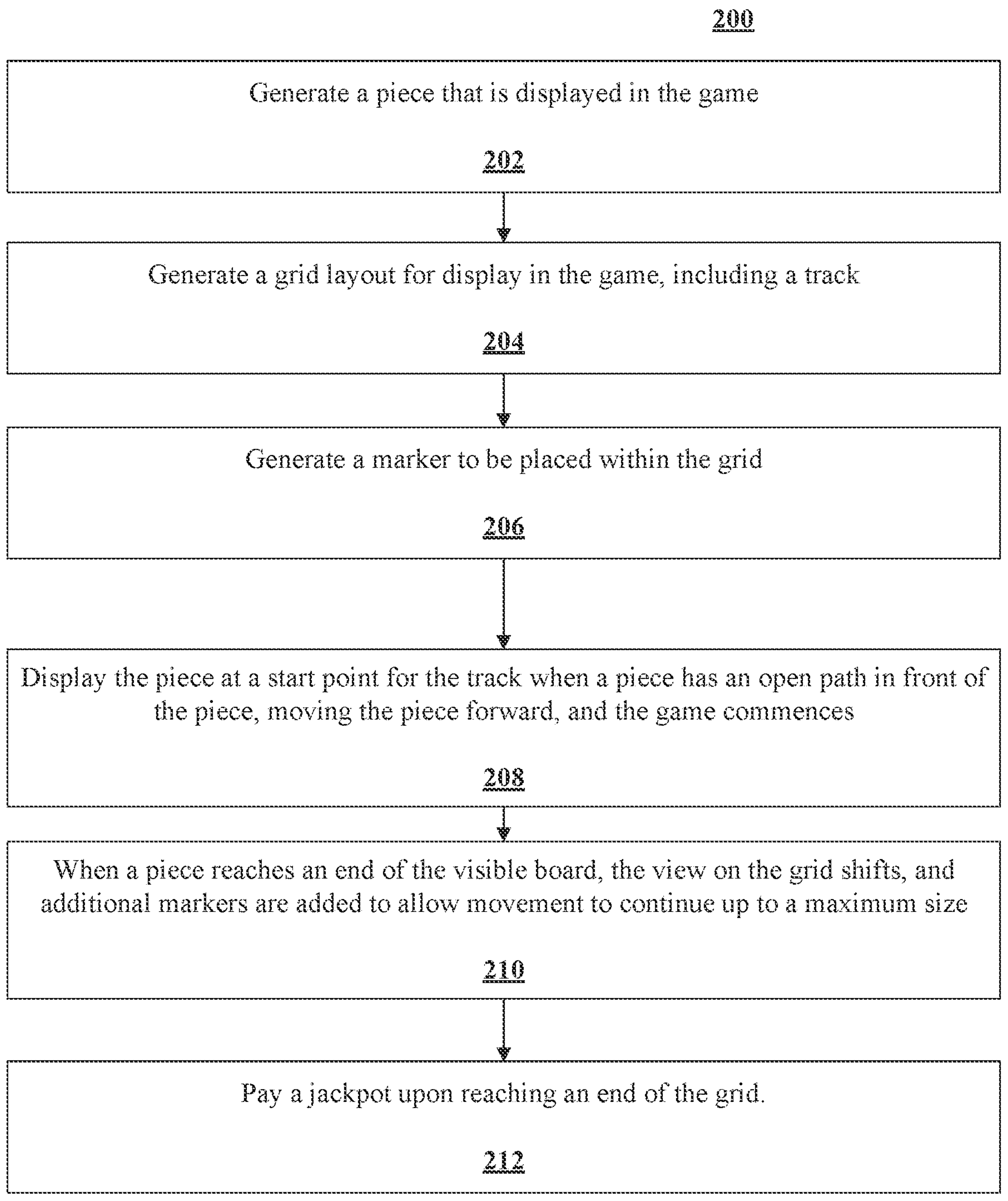
FIG. 2 is a flow diagram illustrating an example method in accordance with the systems and methods described herein.

FIG. 2 is a flow diagram illustrating an example method 200 in accordance with the systems and methods described herein. The method may generate a game piece for display (202). This piece may be designed with unique attributes and visual elements, making it easily identifiable within the game's environment. The method may create a grid layout including a track (204). For example, the system may construct a grid layout for gameplay, integrating a track within this grid. This track serves as the path or route along which the game piece will move, influencing gameplay dynamics.

The method may generate a marker within the grid (206). For example, alongside the grid, the system generates markers. These markers play a role in gameplay, e.g., indicating positions, bonuses, or obstacles within the grid. The method may display the piece at a track start point (208), once the grid and markers are in place, the game piece may be displayed at a designated start point on the track. The piece may be set to move forward when an open path is detected ahead, signifying the commencement of the game.

The method may shift grid view and add markers when piece reaches board end (210). For example, as the game progresses and the piece reaches the end of the visible board, the grid view shifts to reveal new areas. Additional markers may be added at this stage, extending the gameplay by providing new paths and challenges, up to a predetermined grid size. The method may include a potential jackpot payout at grid end (212). For example, the method may include a feature where the player may receive a jackpot payout upon the game piece reaching the end of the grid. This serves as a significant reward mechanism, adding an element of excitement and incentive for players.

Disclosed are example embodiments of a systems and methods related to gaming and gaming systems. In an example, a gaming system includes at least one processor and a memory coupled to the at least one processor. The at least one processor is configured to generate a piece that is displayed in the game. The at least one processor is configured to generate a grid layout for display in the game, including a track. The at least one processor is configured to generate a marker to be placed within the grid. The at least one processor is configured to display the piece at a start point for the track when a piece has an open path in front of the piece, then the piece moves forward, and the game commences. When a piece reaches an end of the visible board, the view on the grid shifts, and additional markers are added to allow movement to continue up to a maximum size. The at least one processor is configured to potentially pay a jackpot upon reaching an end of the grid.

One or more elements or aspects or steps, or any portion(s) thereof, from one or more of any of the systems and methods described herein may be combined with one or more elements or aspects or steps, or any portion(s) thereof, from one or more of any of the other systems and methods described herein and combinations thereof, to form one or more additional implementations and/or claims of the present disclosure.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. It will be appreciated that a variety of programming languages may be used to implement the teachings of the invention as described herein.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An electronic slot game that provides a game space operable on a computer system having an electronic display and at least one processor and a memory coupled to the at least one processor, the at least one processor configured to, upon a user initiated spin having an associated numerical value:

generate the game space that includes a grid defined by a plurality tiles forming a plurality of rows and a plurality of columns in the electronic display, generate an avatar to be placed on one of the plurality of tiles within the grid;

wherein one or more of the plurality of tiles include at least one pathway marker that allows the avatar to move to that one or more of the plurality of tiles that include at least one pathway marker if the avatar is on an adjacent tile either vertically or horizontally and at least one modifier marker that changes the associated numerical value, wherein the at least one pathway marker and the at least one modifier marker are randomly located within the grid upon the user initiated spin, such that when the avatar is adjacent to the one or more of the plurality of tiles with the at least one pathway marker, the avatar moves to that one or more of the plurality of tiles with the at least one pathway marker and the associated numerical value increases, when the avatar moves to the one or more of the plurality of tiles with the at least one modifier marker, the associated numerical value changes in accordance with the at least one modifier marker; and when the avatar is on a tile with no adjacent pathway marker or no adjacent modifier marker either vertically or horizontally, the spin ends.

2. The electronic slot game of claim 1, wherein the at least one processor is further configured to, upon the spin, if the avatar reaches an end of the grid, extend the grid with additional tiles that the avatar can move to during the spin.

3. The electronic slot game of claim 1, wherein upon the spin, the avatar is initially placed on the tile at the bottom or left in the grid.

4. The electronic slot game of claim 1, wherein the grid includes more than one avatar.

5. The electronic slot game of claim 1, wherein the at least one pathway marker and the least one modifier marker are determined through bias.

6. The electronic slot game of claim 1, wherein as the avatar moves along the plurality of tiles of the grid, the associated numerical value of the spin increases until the avatar can travel no further during the spin.

7. The electronic slot game of claim 1, wherein the grid is rectangular in shape.

* * * * *